United States Patent [19]

Benson

[11] Patent Number: 5,954,872

[45] Date of Patent: *Sep. 21, 1999

[54] DRY PHOSPHATE REFRACTORY CONCRETE MATERIALS

[75] Inventor: James T. Benson, Gurnee, Ill.

[73] Assignee: Reno Refractories, Inc., Morris, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,561

[22] Filed: Apr. 14, 1997

Related U.S. Application Data

[60] Provisional application No. 60/037,096, Feb. 4, 1997.

[51] Int. Cl.$^6$ .............................. C04B 9/04; C04B 12/02
[52] U.S. Cl. ........................ 106/691; 106/690; 501/111; 501/124; 501/125
[58] Field of Search .................................. 106/690, 691; 501/111, 116, 124, 125

[56] References Cited

U.S. PATENT DOCUMENTS

| | | | |
|---|---|---|---|
| 2,450,952 | 10/1948 | Greger | 106/121 |
| 3,999,999 | 12/1976 | Henton | 106/85 |
| 4,394,174 | 7/1983 | Tomic | 106/85 |
| 4,419,133 | 12/1983 | Shubow et al. | 106/85 |
| 4,749,413 | 6/1988 | Tomic | 106/85 |
| 5,518,541 | 5/1996 | Fogel et al. | 106/691 |
| 5,536,686 | 7/1996 | Chung | 501/111 |

OTHER PUBLICATIONS

"Resco Extreme Service Castables", Product Data Sheet, Apr., 1993.

*Primary Examiner*—Michael Marcheschi
*Attorney, Agent, or Firm*—Factor and Shaftal

[57] ABSTRACT

The present invention is directed to a dry phosphate cement mixture and process for manufacture of same. The dry mixture includes at least $Al(H_2PO_4)_3$, a group IIA metal bonded to oxygen, and an aggregate. The process for manufacturing cement includes associating the dry reagent with a substantially polar solvent, such as water. The total reagent concentration is formulated such that only nominally exothermic reactions are observed. The process accommodates variable setting times and provides resulting concrete which exhibits formidable structural integrity.

15 Claims, No Drawings

DRY PHOSPHATE REFRACTORY CONCRETE MATERIALS

CROSS REFERENCES TO RELATED APPLICATIONS

This application claims the benefit of U.S. Provisional Application No. 60/037,096, filed Feb. 4, 1997.

BACKGROUND OF THE INVENTION

1. Field of the Invention

The present invention relates in general to dry phosphate refractory concrete materials having MgO and $Al(H_2PO_4)_3$, and more particularly, to special compositions which when synthesized yield nominally exothermic reactions, and use virtually "catalytic" amounts of active materials without sacrificing either structural integrity or variable setting times.

2. Background Art

Refractory concretes, also known as castables, are normally bonded with high-temperature calcium aluminate cement. Cement adlevels commonly range from one to forty percent and setting times are typically variable and range from 30 minutes to over 3 hours. In some instances, a fast setting time is desired, for example, when specialized manufacturing of uniquely-shaped burner block is desired, or, when rapid furnace repairs or patches are needed. Inasmuch as many thousands of dollars per hour are lost while a furnace is non-operational, minimizing such furnace down time is essential. Another example of when a fast set of the refractory material is desired is during the forming and pouring of furnace walls when construction time is extremely limited due to scheduling demands. Indeed, while accelerating the setting time of calcium aluminate concretes is known in the art, the ultimate structural integrity of the material does become adversely affected. Additionally, the initial dry-out and heat-up of the calcium aluminate concrete castable takes a substantial amount of time regardless of, and in addition to, the initial setting time of the mixture.

In addition to the above, safety must be considered when configuring a furnace heat-up schedule. For example, refractory calcium aluminate cement develops strength after hydrating the chemical reagents. Sufficient water must be charged to a cement-bonded high-temperature concrete to hydrate the cement and allow for placement and/or movement of the mass. After the cement-bonded concrete is hardened, the water must be removed slowly before the furnace can be put back into service. Consideration must be given to the permeability of the mass, dynamics of the cement phases and its hydration level. The end result is that heating rates for concrete cure can require up to several hundred hours to reach the furnace operating temperature. As the concrete is heated, the mass functions as a "leaky" autoclave. The pressure caused by the vaporization of the free water and steam released from the dehydration of the cement can be explosive, if the pressure exceeds the tensile strength of the castable. Even if the mass does not actually explode, rapid heating can cause internal cracking and damage that will shorten the ultimate life of the concrete material. This damage is known as thermal shock damage.

The long turn-around times for concrete furnace linings and possible thermal shock damage are just part of the problem associated with conventional refractory material. Indeed, if the furnace lining comes into contact with molten metal, an adverse chemical reaction can occur. This adverse reaction, as observed in calcium aluminate cement systems, is considered a weak link in the ability of refractory concretes to resist molten metal attack and/or penetration of the furnace lining.

Phosphate refractory concretes, on the other hand, have several advantages over traditional calcium aluminate cement-bonded products. The first benefit is that the phosphate bond is not affected by molten aluminum. The metal is non-reactive with the phosphate, unlike the calcium aluminate of traditional cements. Another benefit is curing or firing time. Phosphate-bonded materials generally can be heated much faster than traditional cement-bonded products. Furthermore, there is a much lower chance for sustaining thermal shock damage. Phosphate-bonded concretes use many different types of phosphates and often have a basic component such as magnesium oxide (MgO) which reacts with the phosphate in the presence of water (or an aqueous liquid) whereupon hardening occurs.

Although such conventional phosphate bonded concretes have exhibited various benefits over other conventional refractory materials, problems nevertheless persist. For example, when phosphate-bonded concretes are used, the reaction rate is often so fast that the concrete cannot be poured into place before it hardens. Additionally, when a liquid phosphate or phosphoric acid is used, safe handling of the toxic liquid presents a real hazard, not to mention the burden associated with working with a two-phase system.

Greger, U.S. Pat. No. 2,450,952 (hereinafter "Greger '952") appears to disclose a dry phosphate cement mixture for adhesive applications. The reagents used in Greger '952 included magnesia, olivine and or magnesium silicate mixed with water soluble aluminum phosphate. The weight ratio of the magnesium compound to the phosphate is disclosed to be 2:1 to 8:1. Inasmuch as the set is relatively fast when magnesia is used as a reagent, Greger '952, discloses substituting olivine for the magnesia, to, in turn, slow the set time for as much as 24 hours. However, olivine has limited high temperature applications due to melting point considerations and chemical reactivity at high temperature.

Tomic, U.S. Pat. No. 4,392,174 (hereinafter "Tomic '174") appears to disclose a mixture of magnesium oxide in aluminum phosphates, as well as using aluminum phosphates in liquid form. Aggregates, such as gravel or trap rock are combined with a mixture of magnesium oxide and phosphate, and then used for such applications as patching of highways. However, Tomic '174 teaches the use of high magnesium oxide concentration (as well as other high reagent concentrations). Although such a high concentration appears to provide a phosphate cement with great structural integrity, the percent composition of the active reagents is undesirably high. The result of having such high concentrations of active reagents is that undesirable levels of heat are generated as a result of the exothermic nature of the chemical reaction. Furthermore, the cost of the active reagents in phosphate concretes are quite expensive when compared to the cost of the inactive reagents. When used in such great concentrations, as taught in Tomic '174, the profitability of an installation is adversely affected.

It is thus an object of the present invention to provide a dry phosphate refractory concrete which can be synthesized in a cost effective manner.

It is a further object of the present invention to provide chemical compositions, such that when synthesized, liberate nominally exothermic properties.

It is yet a further object of the present invention to provide phosphate concretes as described above, without sacrificing structural integrity or the necessary enhancement of variable setting times.

More particularly, it is an object of the present invention that regardless of the specific active reagent concentrations (such as those experimentally identified in the present disclosure, relative to the present invention), other reagent concentrations less than conventionally known, and, which, in such relatively low concentration result in hardened refractory material maintaining excellent structural characteristics, are likewise fundamental to the objective parameters of the present invention.

SUMMARY OF THE INVENTION

The present invention is directed to a cement mix comprising: a dry reagent composition including; at least one active dry reagent selected from the group consisting of group IIA elements associated with oxygen, and another active dry reagent comprising $Al(H_2PO_4)_3$, wherein the concentration of the group IIA oxide ranges from about 0.5 to 2.0 percent by weight of the total dry reagent composition; and at least one aggregate.

In a preferred embodiment of the invention, the cement mix further includes an aqueous medium. Additionally, it is contemplated that the aqueous medium is substantially polar.

In another preferred embodiment of the invention, the aggregate is selected from at least one of the group consisting of Olivine, Kyanite, Silica, Bauxite, Aluminum oxide and minerals or synthesized derivatives thereof.

In yet another preferred embodiment of the invention, the group IIA oxide includes MgO. The invention further contemplates that the MgO has a distribution range from minus twelve to positive three hundred mesh. Moreover, the invention contemplates that the $Al(H_2PO_4)_3$ concentration ranges from about 2.2 to 7.3 percent, and the at least one aggregate concentration ranges from about 75 to 95 percent by weight of the total dry reagent composition.

The present invention is also directed to a process for manufacturing cement comprising the steps of: a) dry mixing active reagents, wherein the active reagents includes; at least one active dry reagent selected from the group consisting of group IIA elements associated with oxygen, and another active dry reagent comprising $Al(H_2PO_4)_3$, wherein the concentration of the group IIA oxide ranges from about 0.5 to 2.0 percent by weight of the total dry reagent composition; and at least one aggregate; b) charging an aqueous medium into the dry mix active reagents and aggregates, wherein the step of charging includes maintaining a net active reagent concentration equal to or less than the necessary concentration for observing nominally exothermic synthesis, to in turn, result in an aqueous mixture; and c) setting the resulting aqueous mixture.

In a preferred embodiment of the invention, the process further comprises the step of varying setting times of the resulting aqueous mixture. Moreover, the invention contemplates that the step of varying setting time comprises altering one of at least the dry reagent composition concentrations and particle distribution range.

In another preferred embodiment of the process, the active reagent concentration of $Al(H_2PO_4)_3$ ranges from about 2.2 to 7.3 percent, and the at least one aggregate concentration ranges from about 75 to 95 percent by weight of the total dry reagent composition.

DETAILED DESCRIPTION

While this invention is susceptible of embodiment in many different forms, there is described in detail a specific embodiment with the understanding that the present disclosure is to be considered as an exemplification of the principles of the invention and is not intended to limit the invention to the embodiment described hereinbelow.

At the outset, when magnesium oxide and aluminum phosphate are charged with water, a well-known acid-base type reaction occurs. The concentration of magnesium oxide and its particle size generally determine the setting time of the concrete. The concentration of MgO and $Al(H_2PO_4)_3$ directly affects the exothermic magnitude of the chemical reaction. Indeed, when "non-catalytic" amounts of active reagents are used, a significant exothermic reaction is observed. Accordingly, in each experiment in the present invention, the peak exotherm was nominal as a result of the virtually "catalytic" amounts of active reagents. Dry phosphate concretes of high structural integrity were synthesized using significantly less MgO and $Al(H_2PO_4)_3$ than contemplated by the prior art (see, for example Tomic '174). Moreover, as shown in experiments one, two and five, variable set times were still maintained using such diminished concentrations of active reagents. Amazingly, even with virtually "catalytic" (limited) amounts of active reagents, the phosphate refractory concretes maintained a very high degree of structural integrity. In support of such an invention, several experiments were conducted. The results are summarized herein-below.

Specifically, seven experiments were conducted, wherein the following common experimental procedure was used:

First, the dry reagents, which include at least the aggregate, MgO, and $Al(H_2PO_4)_3$ in which the phosphorus pentoxide ($P_2O_5$) concentration was approximately sixty percent, were charged into a reaction vessel. Second, the dry reagents were mixed via conventional agitation methods for approximately fifteen minutes. Third, the reaction vessel was charged with $H_2O$, which resulted in a "concrete" slurry that was agitated for an additional two minutes. Fourth, the "concrete" reaction mixture was set and cast, which provided suitable material for analytical testing. Next, test samples were analyzed primarily for structural integrity via cold crushing strength methods (CCS). Additionally, analytical test data relating to net structural composition was provided when applicable. These additional tests included compositional density ($\rho$) and modulus of rupture (MOR).

EXPERIMENT NO. 1

In this experiment, the following dry reagents and their respective percent composition by weight were used:

| Dry Reagent | Percent Composition |
| --- | --- |
| Olivine | 90.11 |
| Silica Fume | 4.95 |
| Surfactant | 0.04 |
| MgO | 0.55 |
| $Al(H_2PO_4)_3$ | 2.20 |
| Non-Wetting Agent | 2.15 |

The olivine used in this experiment consisted primarily of four dimensionally different aggregates. The grain sizes of the respective primary aggregates included: 3×50 mesh, 16×70 mesh, 12×40 mesh and 140 mesh material. Furthermore, the chemical composition of the olivine used in this experiment was ninety percent forserite ($2MgO.SiO_2$) and ten percent fayalite ($Fe_2SiO2$). Moreover, the silica fume used was approximately ninety-five percent silica ($SiO_2$) and dimensionally less than one micron. The magnesite (MgO) was technical grade and processed from sea water which was then calcined in a shaft kiln. The grain size of the MgO was one hundred mesh. However, other particle sizes, such as positive three hundred mesh, are suitable for use as well. Anyone of a number of conventional non-wetting agents which are understood in the art can be used.

After following the experimental procedure (as previously described), 6.6% $H_2O$ (by weight) was charged into the reaction vessel and a nominally exothermic reaction was observed. Thereafter, 2×2×2" cubes were formed via vibration casting. The chemical composition of the "concrete" in this experiment provided a hardening ("set") time of ninety minutes. Test data was then collected following conventional industrial method ASTM C133. The test results after drying for sixteen hours at 230° F. provided a compositional density ($\rho$) of 158 pounds per cubic foot (pcf) and a MOR of 166 pounds per square inch (psi). After heating to 1,000° F. and holding the temperature constant for five hours, the MOR increased to 966 (psi), and the CCS was then measured at 3,925 (psi).

EXPERIMENT NO. 2

In this experiment, the following dry reagents and their respective percent composition by weight were used:

| Dry Reagent | Percent Composition |
| --- | --- |
| Bauxite | 8.48 |
| 60% $Al_2O_3$ Aggregate | 55.14 |
| Bauxite Fines | 6.36 |
| Kyanite | 4.24 |
| $Al_2O_3$ | 16.97 |
| MgO | 1.59 |
| $Al(H_2PO_4)_3$ | 5.62 |
| Non-Wetting Agent | 1.60 |

The bauxite used in this experiment was a South American bauxite and was elementally eighty-nine percent $Al_2O_3$ and has a granular range from minus three to positive six mesh. The sixty percent $Al_2O_3$ aggregate was supplied from C-E Minerals in Andersonville, Ga. and is also known commercially as Mulcoa-60. Furthermore, the Kyanite used in this experiment was supplied by Kyanite Mining Company, of Dillwyn, Va. Moreover, the $Al_2O_3$ fines used in this experiment were supplied by ALCOA of Bauxite, Ark. Additionally, the MgO used in this experiment had a particle size of minus twelve mesh. Any one of a number of conventional non-wetting agents which are understood in the art can be used.

After following the previously described experimental procedure, 8.13% $H_2O$ (by weight) was charged into the reaction vessel and a nominally exothermic reaction was observed. Thereafter, 2×2×2" cubes were formed via vibration casting. The composition in this experiment provided a hardening time of 120 minutes. This long hardening time, when compared to experiment No. 1, is attributable to the dimensionally coarser MgO. Test data was then collected following conventional industrial method ASTM C133. The test results after drying for sixteen hours at 230° F. provided a ($\rho$) of 147 (pcf) and the CCS was then measured at 2,218 (psi).

EXPERIMENT NO. 3

In this experiment, the following dry reagents and their respective percent composition by weight were used:

| Dry Reagent | Percent Composition |
| --- | --- |
| Bauxite | 8.43 |
| 60% $Al_2O_3$ Aggregate | 54.79 |
| Kyanite | 4.21 |
| Tabular Alumina | 6.32 |
| Hydrated Alumina | 1.05 |
| MgO | 0.95 |
| $Al(H_2PO_4)_3$ | 5.27 |
| Alumina Fines | 18.97 |

The Alumina used in this experiment was supplied by ALCOA. The tabular Alumina used in this experiment was hard, dense, and a high fired form of Alumina oxide aggregate that had a grain size of minus 325 mesh. The hydrated Alumina was ALCOA's commercial C-30 brand. Moreover, the Bauxite used in this experiment consisted of three by six mesh particles. Furthermore, the MgO had a positive 100 mesh rating.

After following the previously identified experimental procedure 8.43% $H_2O$ (by weight) was charged into the reaction vessel and a nominally exothermic reaction was observed. Thereafter, 2×2×2" cubes were formed via vibration casting. Test data was then collected following conventional industrial methods. The test results after drying at 750° F. provided a ($\rho$) of 148 (pcf) and a CCS of 3,424 (psi). After heating to 2,000° F, ($\rho$) remained constant at 148 (pcf), and the CCS decreased to 3,728 (psi).

EXPERIMENT NO. 4

In this experiment, the following dry reagents and their respective percent composition by weight were used:

| Dry Reagent | Percent Composition |
| --- | --- |
| Bauxite | 11.25 |
| 60% $Al_2O_3$ Aggregate | 67.49 |
| Alumina Fines | 11.25 |
| Hydrated Alumina | 1.12 |
| MgO | 1.01 |
| $Al(H_2PO_4)_3$ | 5.62 |
| Non-Wetting Agent | 2.26 |

The bauxite and MgO used in this experiment were identical to that which was used in experiment number three. The sixty percent $Al_2O_3$ aggregate was supplied from C-E Minerals in Andersonville, Ga. and is also known commercially as Mulcoa-60. The $Al_2O_3$ fines used in this experiment were supplied by ALCOA of Bauxite, Ark. Anyone of a number of conventional non-wetting agents which are understood in the art can be used.

After following the previously identified experimental procedure, 8.43% $H_2O$ (by weight) was charged into the reaction vessel and a nominally exothermic reaction was observed. Thereafter, 2×2×2" cubes were formed via vibration casting. Test data was then collected following conventional industrial methods. The test results after drying at 750° F. provided a ($\rho$) of 150 (pcf) and the CCS was measured at 6,396 (psi). After heating to 2,000° F, ($\rho$) decreased to 146 (pcf), and the CCS decreased to 3,362 (psi).

EXPERIMENT NO. 5

In this experiment, the following dry reagents and their respective percent composition by weight were used:

| Dry Reagent | Percent Composition |
|---|---|
| Fused Alumina | 20.55 |
| Tabular Alumina | 50.23 |
| Fine Alumina | 15.98 |
| 70% Alumina Aggregate | 4.57 |
| MgO | 1.37 |
| Al(H$_2$PO$_4$)$_3$ | 7.31 |
| Non-Wetting Agent | 0.00 |

In this experiment, the fused Alumina consisted of three by six mesh particles. Furthermore, the MgO used in this experiment had a 100 mesh particle size.

After following the previously described experimental procedure, 7.4% H$_2$O (by weight) was charged into the reaction vessel and a nominally exothermic reaction was observed. Thereafter, 2×2×2" cubes were formed via vibration casting. The composition in this experiment provided a hardening time of 40 minutes. Test data was then collected following conventional industrial methods. The test results after drying at 750° F. provided a ($\rho$) of 160 (pcf) and the CCS was measured at 6,988 (psi). Upon heating to 1500° F. a HOT MOR of 2,178 (psi) was observed, using ASTM C-583. After heating to 2000° F. a ($\rho$) of 160 (pcf) was provided and the CCS was measured at 6,306 (psi).

EXPERIMENT NO. 6

In this experiment, the following dry reagents and their respective percent composition by weight were used:

| Dry Reagent | Percent Composition |
|---|---|
| Tabular Alumina | 65.61 |
| Fused Alumina | 20.36 |
| 70% Aggregate | 4.52 |
| Al(H$_2$PO$_4$)$_3$ | 7.24 |
| MgO | 2.03 |

In this experiment, the MgO had a 100 mesh particle size.

After following the previously described experimental procedure, 6.5% H$_2$O (by weight) was charged into the reaction vessel and a nominally exothermic reaction was observed. Thereafter, 2×2×2" cubes were formed via vibration casting. The composition in this experiment provided a hardening time of 45 minutes. Test data was then collected following conventional industrial methods. The test results after drying at 2,000° F. provided a ($\rho$) of 170 (pcf) and the CCS was measured at 5,565 psi. Upon heating to 2,500° F. a ($\rho$) of 171 (pcf) was provided and the CCS was measured at 8,227 (psi).

EXPERIMENT NO. 7

In this experiment, the following dry reagents and their respective percent composition by weight were used:

| Dry Reagent | Percent Composition |
|---|---|
| 60% Aluminum Oxide Aggregate | 87.34 |
| Kyanite | 2.80 |
| Al(H$_2$PO$_4$)$_3$ | 6.99 |
| MgO | 1.31 |
| Non-Wetting Additive | 1.56 |

In this experiment, the MgO had a 100 mesh particle size.

After following the previously described experimental procedure, 7.6% H$_2$O (by weight) was charged into the reaction vessel and a nominally exothermic reaction was observed. Thereafter, 2×2×2" cubes were formed via vibration casting. The composition in this experiment provided a hardening time of 30 minutes. Test data was then collected following conventional industrial methods. The test results after drying at 750° F. provided a ($\rho$) of 140 (pcf) and the CCS was measured at 4,456 (psi). Upon heating to 2,000° F. a ($\rho$) of 140 (pcf) was provided and the CCS was measured at 5,078 (psi). Upon further heating to 2,500° F. a ($\rho$) of 142 (pcf) was provided and the CCS was measured at 10,540 (psi).

To help summarize the benefits of the present invention, the relevant experimental data collected in the above-identified experiments one through seven has been summarized in Table I, hereinbelow:

TABLE I

| Experiment Number | % MgO | MgO Particle Size (mesh) | % Al(H$_2$PO$_4$)$_3$ | Peak Exotherm | Cold Crushing Strength (psi) |
|---|---|---|---|---|---|
| Experiment 1 | 0.55 | 100 | 2.20 | Nominal | 3,925 at 1,000° F. |
| Experiment 2 | 1.59 | −12 | 5.62 | Nominal | 2,218 at 230° F. |
| Experiment 3 | 0.95 | 100 | 5.27 | Nominal | 3,424 at 750° F. |
| | | | | | 3,728 at 2,000° F. |
| Experiment 4 | 1.01 | 100 | 5.62 | Nominal | 6,396 at 750° F. |
| | | | | | 3,362 at 2,000° F. |
| Experiment 5 | 1.37 | 100 | 7.31 | Nominal | 6,988 at 750° F. |
| | | | | | 6,306 at 2,000° F. |
| Experiment 6 | 2.03 | 100 | 7.24 | Nominal | 5,565 at 2,000° F. |
| | | | | | 8,227 at 2,500° F. |
| Experiment 7 | 1.31 | 100 | 6.99 | Nominal | 4,456 at 750° F. |
| | | | | | 5,078 at 2,000° F. |
| | | | | | 10,540 at 2,500° F. |

As evident from Table I, the concentration of MgO ranged from 0.55 to 2.03 percent, and the average MgO used was 1.27 percent. Moreover, the concentration of Al(H$_2$PO$_4$)$_3$ used in each of the experiments ranged from 2.20 to 7.31 percent, and the average Al(H$_2$PO$_4$)$_3$ was 5.75 percent. As can be observed, such low uses of active reagent concentrations results in nominal exotherms during synthesis, and cost-effective concrete installations. Furthermore, in every experiment, the structural integrity of the concrete remained very high as evident from the favorable CCS values. Finally, although not shown in Table I, experiments one, two, and five revealed that variable set times ranging from forty minutes to over two hours are still possible in light of the present invention.

The foregoing description merely explains and illustrates the invention and the invention is not limited thereto except insofar as the appended claims are so limited, as those skilled in the art who have the disclosure before them will be able to make modifications or variations therein without departing from the scope of the invention.

What is claimed:

1. A refractory cement mixture comprising a dry reagent composition including:

at least one oxide of an element belonging to group IIA of the periodic table present in an amount of 0.5 to 2.0 percent by weight of the dry reagent composition;

Al(H2PO4)$_3$; and at least one aggregate, wherein the aggregate is selected from the group consisting of olivine, silica, aluminum oxide, kyanite and bauxite.

2. The refractory cement mixture according to claim 1, further including an aqueous medium.

3. The refractory cement mixture according to claim 2, wherein the aqueous medium consists of a polar solution.

4. The refractory cement mixture according to claim 1, wherein the Al(H$_2$PO$_4$)$_3$ is present in an amount of about 2.2 to 7.3 percent by weight of the total dry reagent composition.

5. The refractory cement mixture according to claim 1, wherein the at least one aggregate is present in the amount of from about 75 to 95 percent by weight of the dry reagent concentration.

6. The refractory cement mixture according to claim 1, wherein the group IIA oxide has a particle size range from minus twelve to positive three hundred mesh.

7. The refractory cement mixture according to claim 1, wherein the group IIA oxide comprises MgO.

8. A process for manufacturing refractory cement comprising:

dry mixing active reagents so as to form a dry reagent composition, wherein the active reagents include:
   at least one oxide of an element belonging to group IIA of the period table present in the amount of 0.5 to 2.0;

Al(H$_2$PO$_4$)$_3$; and at least one aggregate, wherein the aggregate is selected from the group consisting of olivine, silica, aluminum oxide, kyanite and bauxite.

9. The process according to claim 8, wherein the Al(H$_2$PO$_4$)$_3$ is present in an amount of about 2.2 to 7.3 percent by weight of the total dry reagent composition.

10. The process according to claim 9, further comprising the steps of:

charging water into the dry mixture of active reagents and an aggregate such that an aqueous mixture is synthesized during a exothermic reaction; and curing the resulting aqueous mixture.

11. The process according to claim 10, further comprising the step of:

varying the amount of one or both of the oxide of an element belonging to group IIA of the periodic table or the Al(OH$_2$PO$_4$)$_3$ to, in turn, adjust the curing time of the resulting aqueous mixture.

12. The process according to claim 8, further comprising the steps of:

charging water into the dry mixture of active reagents and an aggregate such that an aqueous mixture is synthesized during an exothermic reaction; and curing the resulting aqueous mixture.

13. The process according to claim 12, wherein the process further comprises the step of:

varying the concentration of one or both of the oxide of an element belonging to group IIA of the periodic table or the Al(H$_2$PO$_4$)$_3$ to, in turn, adjust the curing time of the resulting aqueous mixture.

14. The process according to claim 10 wherein the active reagents have a particle size and the curing time of the aqueous mixture is varied by varying the particle size of one of the reagents.

15. The process according to claim 12 wherein the active reagents have a particle size and the curing time of the aqueous mixture is varied by varying the particle size of on of the reagents.

* * * * *

UNITED STATES PATENT AND TRADEMARK OFFICE
CERTIFICATE OF CORRECTION

PATENT NO. : 5,954,872
DATED :
INVENTOR(S) : September 21, 1999

James T. Benson

It is certified that error appears in the above-identified patent and that said Letters Patent is hereby corrected as shown below:

Col. 1, Line 14            After "and" delete AI and insert instead -- Al --.

Col. 9, Line 17            After "Al" delete $(H2PO4)_3$ and insert instead $(H_2PO_4)_3$ Signed and Sealed this Twenty-fifth Day of April, 2000

Attest:

Q. TODD DICKINSON

*Attesting Officer*          *Director of Patents and Trademarks*